United States Patent [19]
Aoki

[11] Patent Number: 5,272,566
[45] Date of Patent: Dec. 21, 1993

[54] VARIFOCAL LENS SYSTEM
[75] Inventor: Norihiko Aoki, Tokyo, Japan
[73] Assignee: Olympus Optical Co., Ltd., Tokyo, Japan
[21] Appl. No.: 982,774
[22] Filed: Nov. 27, 1992
[30] Foreign Application Priority Data Nov. 27, 1991 [JP] Japan .................. 3-312219

[51] Int. Cl.$^5$ .................. G02B 15/14; G02B 9/34
[52] U.S. Cl. .................. 359/686; 359/773; 359/791
[58] Field of Search .......... 359/680, 682, 684, 686, 359/715, 716, 753, 773, 791

[56] References Cited
U.S. PATENT DOCUMENTS

| | | | |
|---|---|---|---|
| 4,822,152 | 4/1989 | Yamanashi | 359/686 |
| 4,840,468 | 6/1989 | Tanaka | 359/686 |
| 5,002,373 | 3/1991 | Yamanashi | 359/684 |
| 5,069,536 | 12/1991 | Ogata | 359/791 |
| 5,105,311 | 4/1992 | Tokumaru et al. | 359/686 |
| 5,144,488 | 9/1992 | Endo et al. | 359/773 |
| 5,196,962 | 3/1993 | Aoki | 359/686 |

FOREIGN PATENT DOCUMENTS

| | | |
|---|---|---|
| 63-43115 | 2/1988 | Japan . |
| 63-153511 | 6/1988 | Japan . |
| 1-252915 | 10/1989 | Japan . |
| 1-252916 | 10/1989 | Japan . |
| 3-17609 | 1/1991 | Japan . |
| 3-45916 | 2/1991 | Japan . |
| 4-37810 | 2/1992 | Japan . |
| 4-76511 | 3/1992 | Japan . |
| 4-78810 | 3/1992 | Japan . |
| 4-78811 | 3/1992 | Japan . |
| 4-78812 | 3/1992 | Japan . |
| 4-78813 | 3/1992 | Japan . |
| 4-78814 | 3/1992 | Japan . |

Primary Examiner—Bruce Y. Arnold
Assistant Examiner—Evelyn A. Lester
Attorney, Agent, or Firm—Cushman, Darby & Cushman

[57] ABSTRACT

The invention provides a compact, light-weight varifocal lens system that has a varifocal ratio of about 3, comprises fewer lenses than in the prior art, has a short total length and is well corrected in terms of various aberrations from the wide angle to telephoto ends. This lens system comprises a first positive lens unit G1, a second positive lens unit G2 and a third negative lens unit G3, wherein varifocal motion is achieved by moving each unit in such a way that, from the wide angle to telephoto ends, the air space between the first and second lens units increases, while the air space between the second and third lens units decreases.

27 Claims, 9 Drawing Sheets

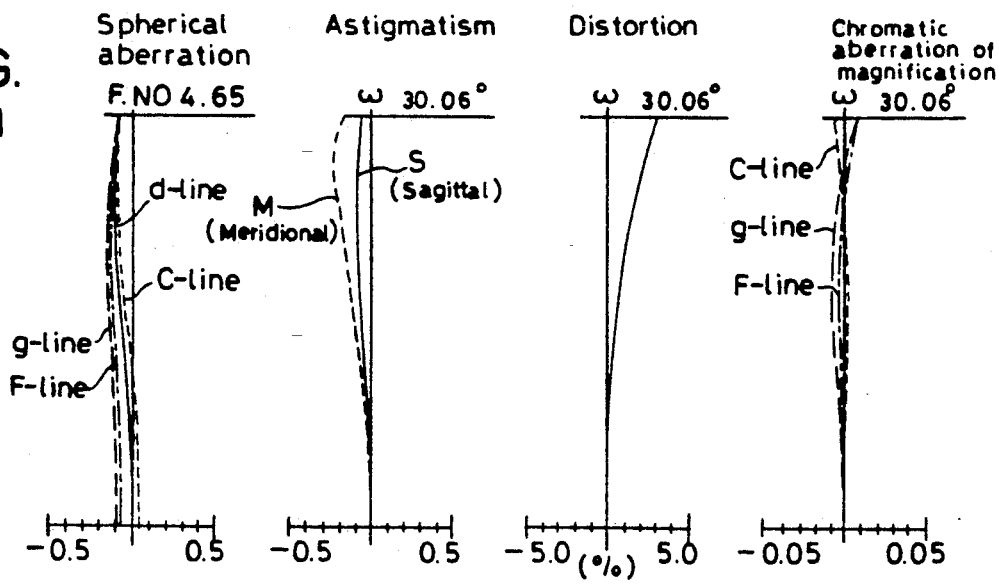
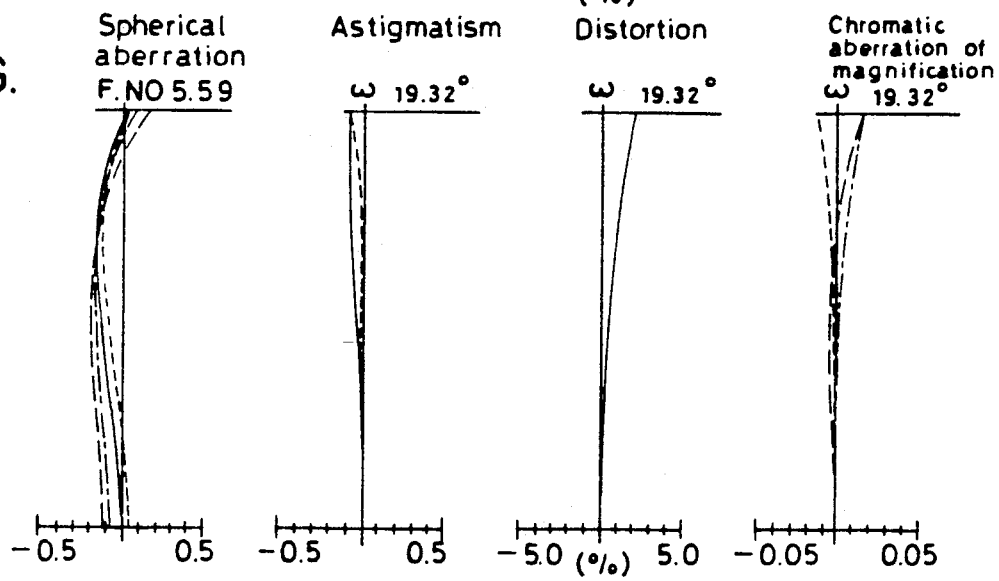
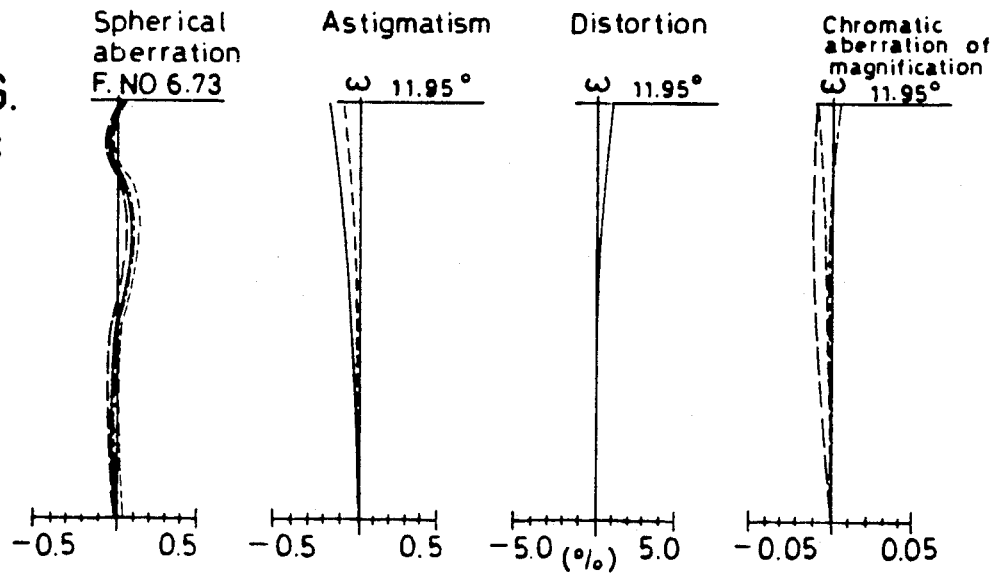

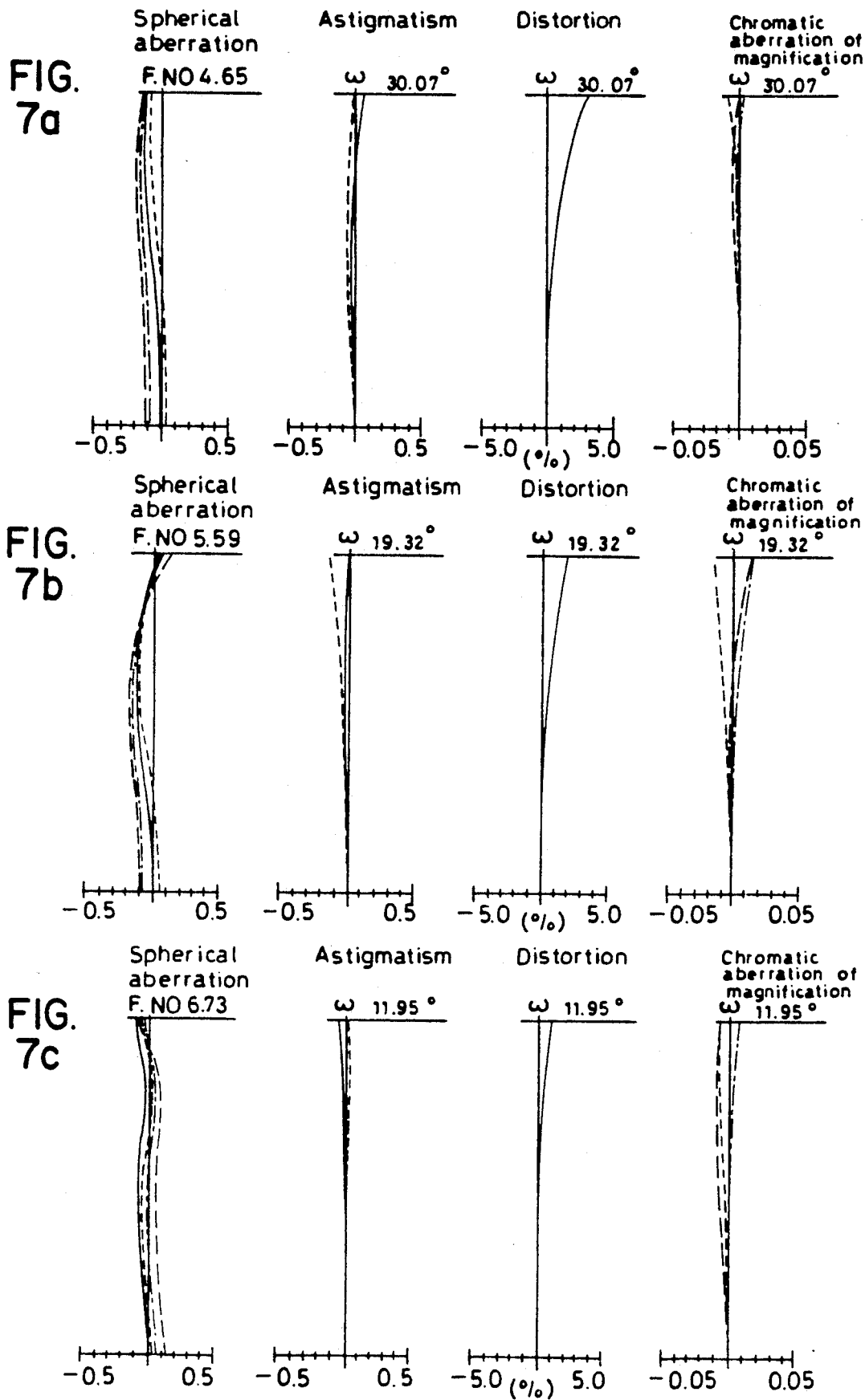

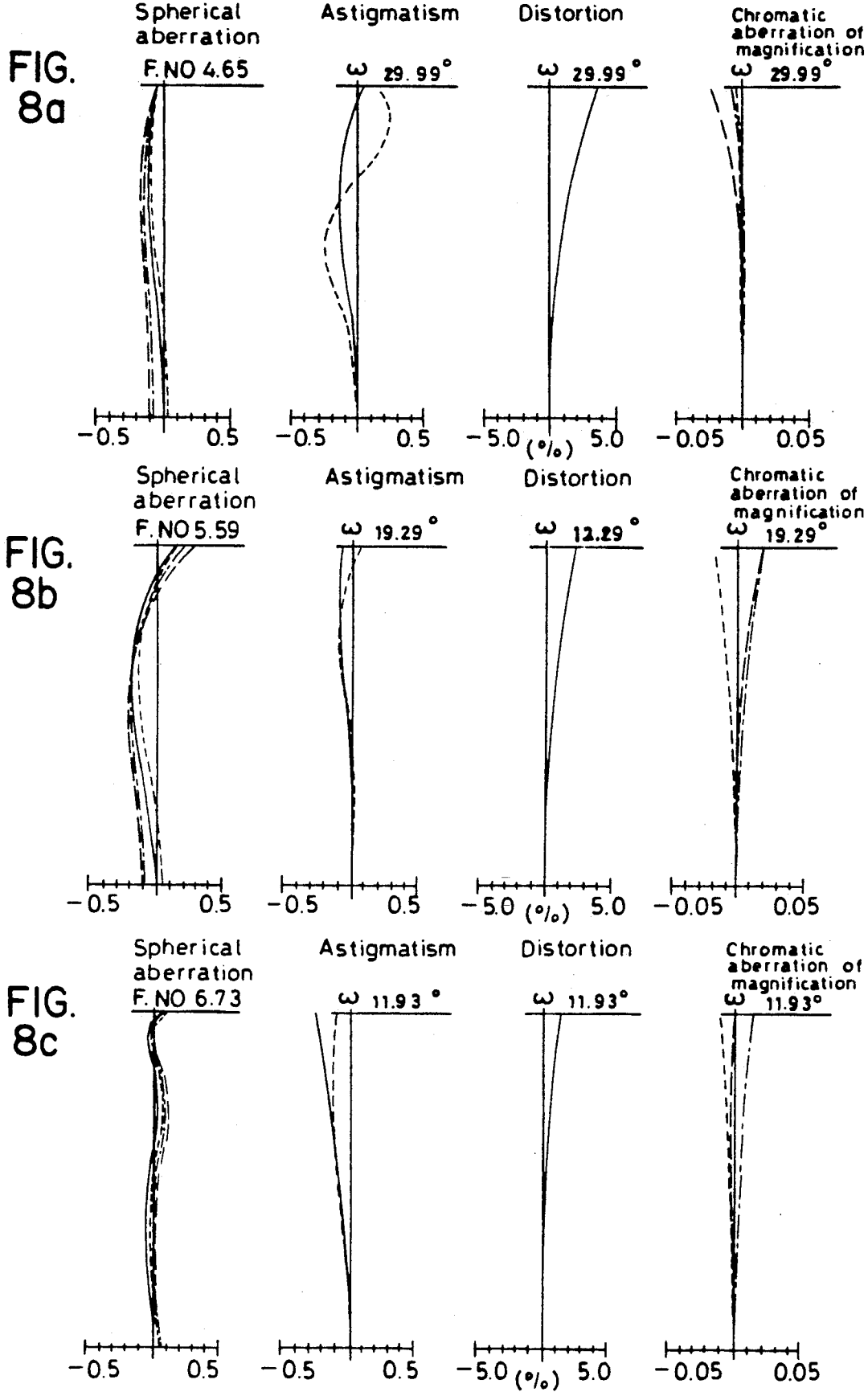

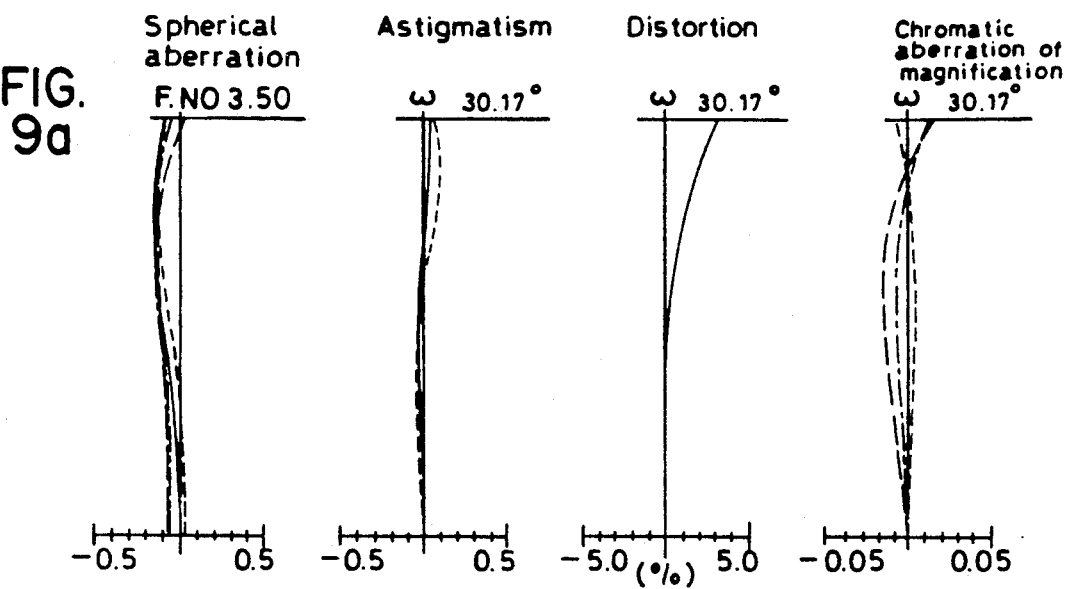
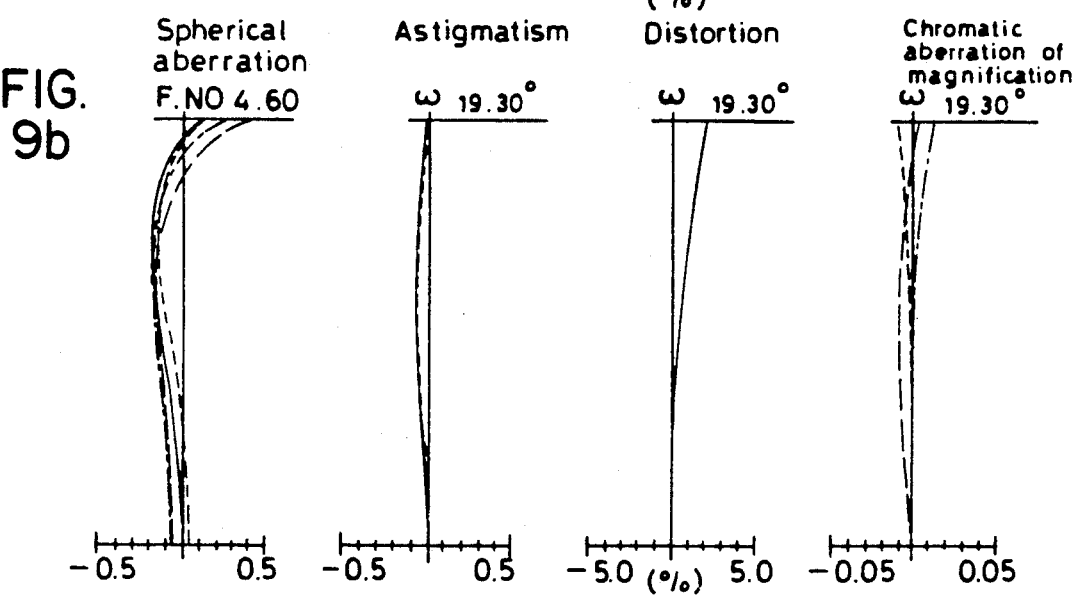
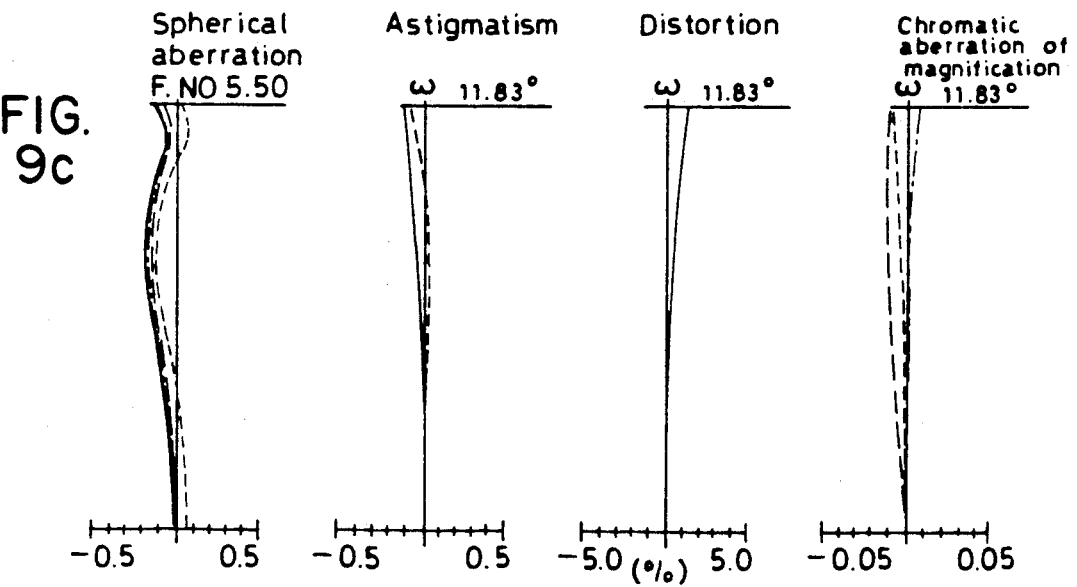

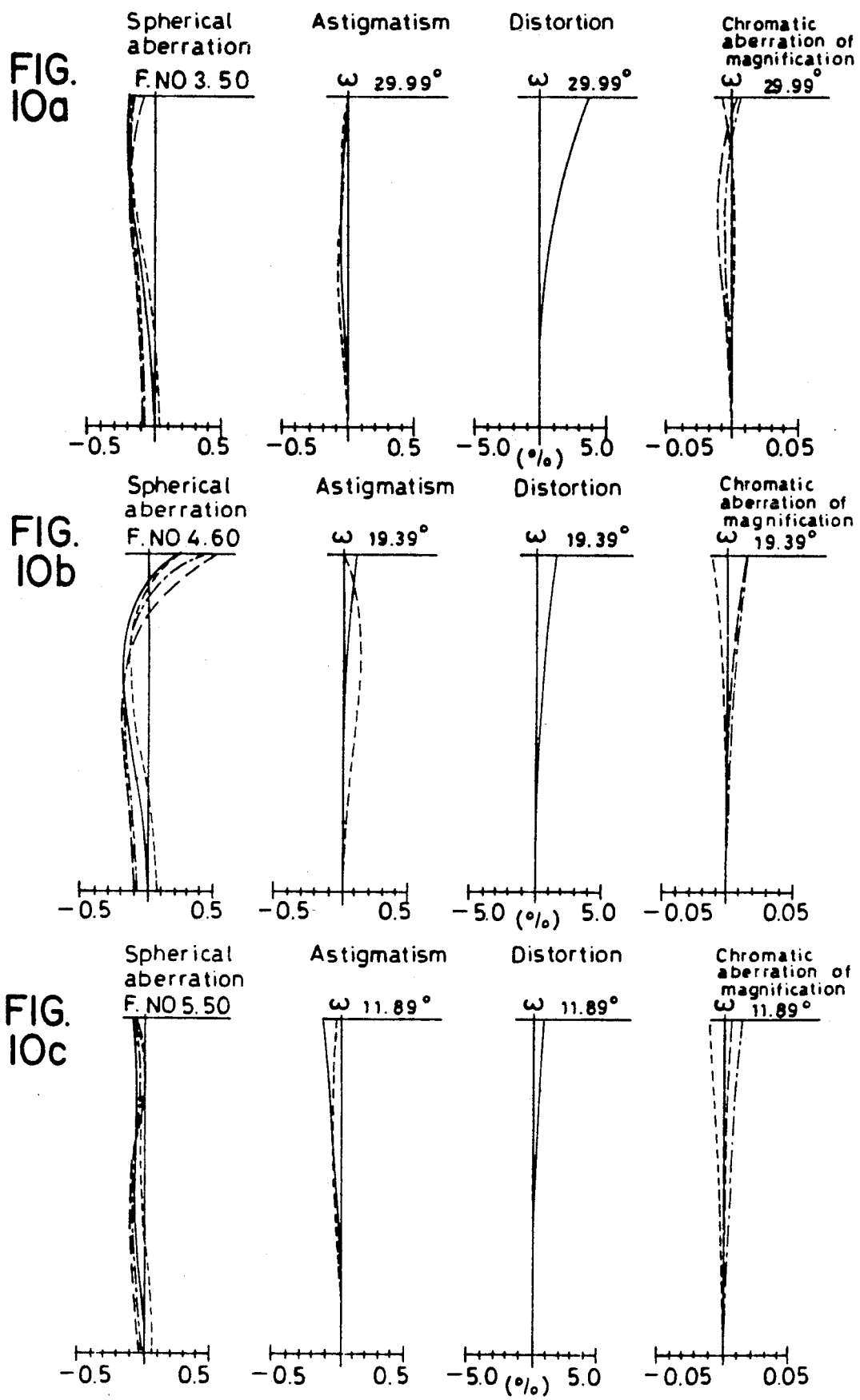

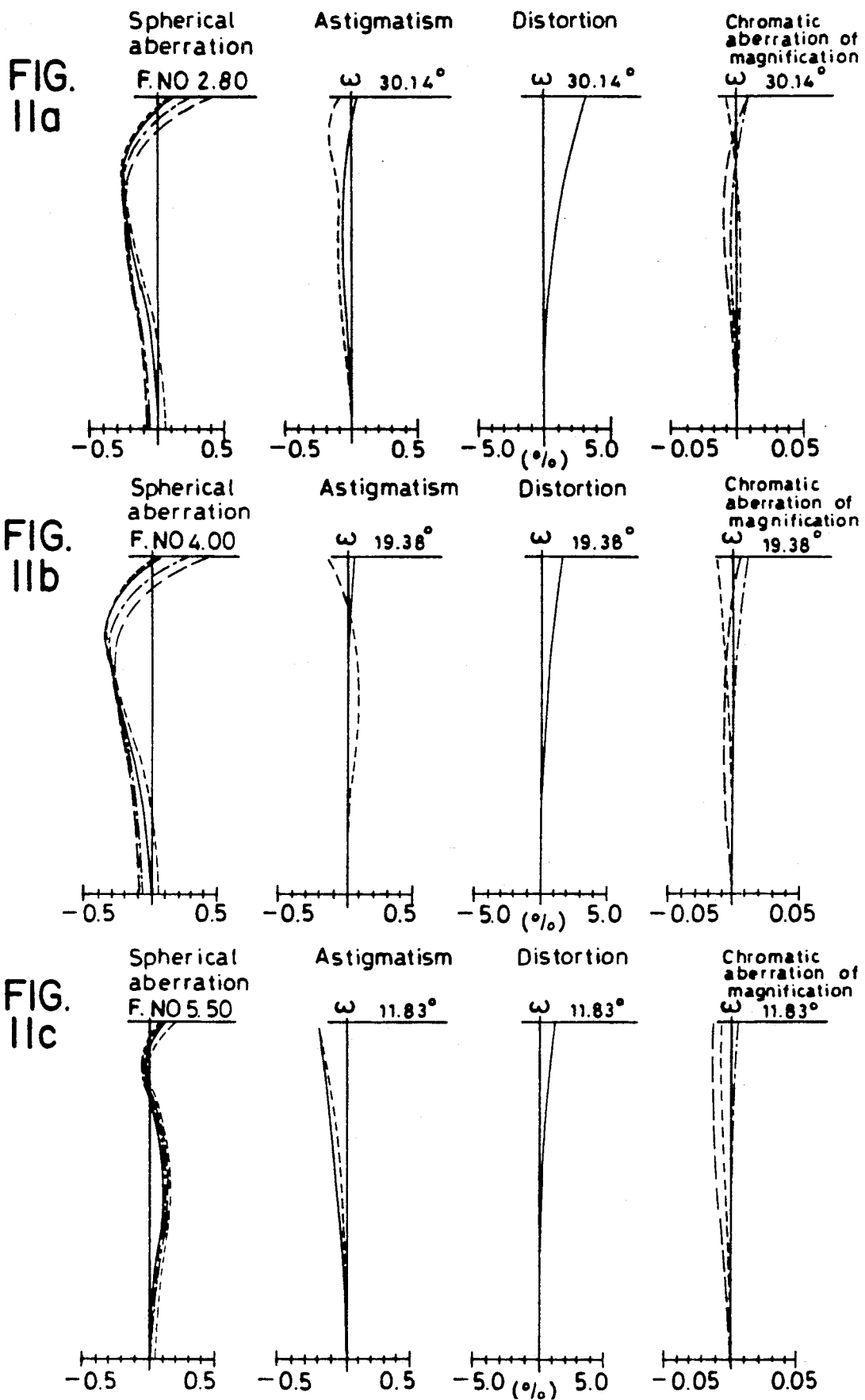

VARIFOCAL LENS SYSTEM

BACKGROUND OF THE INVENTION

The present invention relates generally to a varifocal lens system, and more particularly to a compact, high-varifocal ratio lens system that is designed for use with lens shutter cameras.

Prior Art

Recent size reductions of cameras cause varifocal lens systems to reduce in size and weight. Especially for lens shutter cameras with the lenses being not interchangeable, compact lens systems that have a varifocal ratio of 3 or so are required.

Among varifocal lens systems designed and known to meet demands for size and weight reductions, there is a lens system comprising a front lens unit of positive refracting power and a rear lens unit of negative refracting power, wherein the space between both the lens units is varied for varifocal motion. With this type of varifocal lens system, however, it is difficult to obtain a varifocal ratio as high as 2 or more, because varifocal motion occurs through the rear lens unit of negative refracting power, which has a magnification more than 1.

Typical examples of lens systems that overcome this problem and have a varifocal ratio as high as 3 or so are set forth by the present applicant in JP-A-63-43115 and 63-153511 that are directed to lens systems comprising three, say, positive, positive and negative units or four, say, positive, negative, positive and negative units in order from the object side, or in JP-A-1-252915 and 1-252916 that are directed to lens systems comprising three, say, positive, positive and negative units or four, say, positive, negative, positive and negative units in order from the object side. However, these examples comprise at least 11 lenses, even when aspherical surfaces are incorporated in them, and have so long a total length at the wide angle ends that some problems arise in connection with size and weight reductions.

Moreover, the present applicant has come up with optical systems wherein the varifocal lens systems having a varifocal ratio of about 3 are microminiaturized by using a distributed index lens having an index distribution in the radial direction or an aspherical surface, as disclosed in JP-A-3-17609 and 3-45916. However, these examples comprise 9 or more lenses and so are again less than satisfactory in view of weight reductions.

SUMMARY OF THE INVENTION

In view of such problems as mentioned above, an object of the invention is to provide a varifocal lens system that has a varifocal ratio of about 3, comprises a reduced number of lenses, has a short total length, is well corrected in terms of various aberrations from the wide angle to telephoto ends, and is reduced in terms of size and weight.

According to the first aspect of the invention, the object mentioned above is achieved by the provision of a varifocal lens system comprising, in order from the object side, a first lens unit of positive refracting power, a second lens unit of positive refracting power and a third lens unit of negative refracting power, in which at least one of said first, second and third lens units is moved such that the air space between said first and second lens units widens from the wide angle to telephoto ends and the air space between said second and third lens units narrows from the wide angle to telephoto ends, thereby achieving varifocal motion, and which conforms to the following conditional formulae (1) and (6):

$$0.2 < f_w/f_I < 0.5 \quad (1), \text{ and}$$

$$-1.0 < f_w/f_s < -0.5 \quad (6)$$

where $f_w$ is the composite focal length of the total system at the wide angle end, $f_1$ is the composite focal length of the first lens unit and $f_s$ is the composite focal length at the wide angle end of the lenses located on the object side in front of an aperture stop According to the second aspect of the invention, there is provided a varifocal lens system comprising, in order from the object side, a first lens unit of positive refracting power, a second lens unit of negative refracting power, a third lens unit of positive refracting power and a fourth lens unit of negative refracting power, in which at least two of said first, second, third and fourth lens units are moved such that the air space between said first and second lens units widens from the wide angle to telephoto ends, the air space between said second and third lens units varies from the wide angle to telephoto ends, and the air space between said third and fourth lens units narrows from the wide angle to telephoto ends, thereby achieving varifocal motion, and which conforms to the following conditional formulae (1) and (6):

$$0.2 < f_w/f_I < 0.5 \quad (1), \text{ and}$$

$$-1.0 < f_w/f_s < -0.5 \quad (6)$$

where $f_w$ is the composite focal length of the total system at the wide angle end, $f_1$ is the composite focal length of the first lens unit and $f_s$ is the composite focal length at the wide angle end of the lenses located on the object side in front of an aperture stop More specifically, the invention includes a varifocal lens system comprising, in order from the object side, a first lens unit consisting of a first negative lens and a second positive lens and having a positive refracting power as a whole, a second lens unit consisting of a first positive lens, a second negative lens, a third negative lens and a fourth positive lens and having a positive refracting power as a whole, and a third lens unit consisting of a first positive lens and a second negative lens and having a negative refracting power as a whole, wherein the air space between said first and second lens units is increased from the wide angle to telephoto ends and the air space between said second and third lens units is decreased from the wide angle to telephoto ends, thereby achieving varifocal motion.

Further, the invention includes a varifocal lens system comprising, in order from the object side, a first lens unit consisting of a first negative lens and a second positive lens and having a positive refracting power as a whole, a second lens unit consisting of a first negative lens, a second positive lens, a third negative lens and a fourth positive lens and having a positive refracting power as a whole, and a third lens unit consisting of a first positive lens and a second negative lens and having a negative refracting power as a whole, in which the air space between said first and second lens units is increased from the wide angle to telephoto ends and the air space between said second and third lens units is decreased from the wide angle to telephoto ends, thereby achieving varifocal motion and which conforms to the following condition (6):

$$-1.0 < f_w/f_s < -0.5 \quad (6)$$

where $f_w$ is the composite focal length of the total system at the wide angle end, and $f_s$ is the composite focal length at the wide angle end of the lenses located on the object side in front of an aperture stop Still further, the invention includes a varifocal lens system comprising, in the order from the object side, a first lens unit consisting of a negative lens and a positive lens and having a positive refracting power as a whole, a second lens unit consisting of a negative lens and a positive lens and having a negative refracting power as a whole, a third lens unit consisting of a negative lens and a positive lens and having a positive refracting power as a whole and a fourth lens unit consisting of a positive lens and a negative lens and having a negative refracting power as a whole, wherein, from the wide angle to telephoto ends, the air space between said first and second lens units increases, the air space between said second and third lens units varies and the air space between said third and fourth lens units decreases, thereby achieving varifocal motion.

In the ensuing description, why the constructions mentioned above are adopted and how they act will now be explained chiefly with reference to the three-unit arrangements.

In order to reduce the total length at the wide angle end in particular, the varifocal lens system of the invention is of the so-called telephoto type that, at the telephoto end, the first and second lens units, both of positive refracting powers, are located in proximity to each other and the third lens unit of negative refracting power is located with an air space that is larger than that between the first and second lens units. When it is intended to reduce the total length of this type of varifocal lens system, this may be achieved by increasing the refracting powers of the lens units. In order to secure the necessary back focus and attain well-enough performance, however, it is required to increase the number of lenses used, but this makes it impossible to reduce the total length. In the invention, the following conditional formulae (1) and (2) are set down to reduce the total length of the varifocal lens system at the wide angle end in particular, while limiting the number of the lenses of the first lens unit to 2 or so. In other words, they define the ratio of the composite focal length of the first lens unit to that of the second lens unit.

$$0.2 < f_w/f_1 < 0.5 \quad (1),$$

$$0.15 < f_2/f_1 < 0.45 \quad (2), \text{ and}$$

$$-0.9 < f_3/f_w < -0.6 \quad (3).$$

Here $f_w$ is the composite focal length of the total varifocal lens system at the wide angle end, $f_1$ is the composite focal length of the first lens unit, $f_2$ is the composite focal length of the second lens unit and $f_3$ is the composite focal length of the third lens unit.

Below the lower limits of the conditions (1) and (2), the refracting power of the first lens unit becomes weak, and this is desirous for limiting the number of the lenses of the first lens unit to 2 or so. In order to reduce the total length of the varifocal lens system, however, this results in need of increasing the refracting power of the second lens unit, and is rather unpreferred, because it is then required to increase the number of the lenses of the second lens unit for aberration correction. When the upper limits of the conditions (1) and (2) are exceeded, on the other hand, aberrations occurring in the first lens unit are too large to correct, unless the number of the lenses of the first lens unit is increased. Further, when there is a departure from the upper and lower limits of the condition (2), the first and second lens units are so off balance that it is difficult to increase the varifocal ratio to 3 or thereabouts while aberrations remain corrected.

In order to reduce the total length of a varifocal lens system at the wide angle end while the back focus is kept constant, it is desired that the degree of increasing the composite negative refracting power of the third lens unit be greater than that of increasing the composite positive refracting power of the first and second lens units. The above conditional formula (3) is set down to reduce the total length of the varifocal lens system at the wide angle end in particular, while the necessary back focus remains secured. If there is a departure from the lower limit of the condition (3), the negative refracting power of the third lens unit becomes too weak to reduce the total length of the varifocal lens system at the wide angle end, whereas exceeding the upper limit of the condition (3) is preferable for reducing the total length, but positive distortion and positive spherical aberration occurring in the third lens unit are so large that it is impossible to correct positive distortion at the wide angle end and spherical aberration at the telephoto end.

In the lens system of the invention, it is further preferred that not only is the condition (3) satisfied, but at least one aspherical surface is incorporated in the third lens unit as well, which surface decreases in terms of negative refracting power as it is spaced away from the optical axis. This is because some positive distortion occurring at the wide angle end in particular can be corrected more satisfactorily.

With the construction mentioned above, the varifocal lens system of the invention is well achievable. However, a more favorable lens system can be obtained by the addition of the following conditions.

Now let the point of intersection of the above aspherical surface with the optical axis denote the origin, x the optical axis direction and y the direction normal thereto. Then, the configuration of this aspherical surface is given by $$x = (y^2/r)/[1 + \{1 - P(y^2/r^2)\}^{2/1}] + A_4 y^4 + A_6 y^6 + A_8 y^8 + A_{10} y^{10} \ldots A_{2i} y^{2i} + \cdots$$

where r is the radius of curvature of the reference spherical surface, P is the conical coefficient and $A_4$, $A_6$, $A_8$, $A_{10}$ ... $A_{2i}$ are the aspherical coefficients.

In the invention, it is desired that the aspherical surface incorporated in the third lens unit of negative refracting power conform to the following conditional formula (4):

$$0.1 \times 10^{-2} < \Sigma |\Delta_x|/h < 0.3 \times 10^{-1} \quad (4)$$

where $\Delta_x$ denotes the aspherical quantity at the ray height at which the principal ray reaching the maximum image height at the wide angle end passes through the aspherical surface, h stands for the maximum image height and Σ represents the sum of a plurality of aspherical surfaces, when they are used.

Below the lower limit of the condition (4) the aspherical quantity becomes too small to correct positive distortion at the wide angle end in particular, whereas exceeding the upper limit thereof is unpreferred because of overcorrection.

With the aspherical surface incorporated in the third lens unit, it is possible to correct some considerable distortion occurring at the wide angle end, if it is located somewhere therein. However, it is particularly favorable in view of cost that the aspherical surface is applied to the surface of the third lens unit that has a small effective diameter and is proximate to the object side.

In order to provide well correction of spherical aberration from the wide angle to telephoto ends, it is desired that the lens system of the invention include at least one aspherical surface in the second lens unit of positive refracting power, which surface decreases in terms of positive refracting power as it is spaced away from the optical axis, and conform to the following conditional formula (5):

$$0.1 \times 10^{-2} < \Sigma(|\Delta_{xm}|/h_m) < 0.3 \times 10^{-1} \quad (5)$$

Here $h_m$ represents the height of a marginal ray when the marginal ray with the object point at the infinite point passes through the aspherical surface, $\Delta_{xm}$ stands for the aspherical quantity at that ray height and Σ denotes the sum of a plurality of aspherical surfaces, when they are used.

Below the lower limit of the condition (5) it is impossible to correct spherical aberration through the total system, whereas exceeding the upper limit thereof is not preferred because not only is spherical aberration overcorrected, but the aspherical quantity becomes too large as well, resulting in some cost rise.

With the aspherical surface incorporated in the second lens unit, it is possible to correct spherical aberration if it is located somewhere therein. However, it is particularly preferable that this spherical surface is applied to the surface of the second lens unit that enables the marginal ray to be refracted with a large power and is proximate to the image side. This is because the effect of the aspherical surface reaches the maximum.

A further miniaturization is achieved by satisfying the following conditional formula (6):

$$-0.1 < f_w/f_s < -0.5 \quad (6)$$

Here $f_s$ is the composite focal length at the wide angle end of the lenses located on the object side in front of an aperture stop.

The conditional formula (6) is set down to define the location of the entrance pupil of the overall lens system especially with a view to reducing the effective diameter of the first lens unit, thereby achieving the miniaturization of the lens system. Falling short of the lower limit of the condition (6) is not preferred, because although the location of the entrance pupil of the total system approximates to the object side, but the refracting powers of the lenses on the object side in front of the stop, with the result that aberrations occurring there become too large to correct, unless the number of lenses used is increased. When the upper limit thereof is exceeded, the location of the entrance pupil of the total system moves toward the image side, so that the effective diameter of the first lens unit becomes too large to make the total system compact.

The object of the invention may also be attained by limiting the lens arrangements of the lens units and specifying the aspherical surfaces. That is, since a varifocal lens system must be corrected in terms of chromatic aberration, at least one lens with a different sign is required for each lens unit thereof. With this in mind, the optical system of the invention comprises the first lens unit of positive refracting power that consists of two lenses, negative and positive in order from the object side, the second lens unit of positive refracting power that consists of four lenses, negative, positive, negative and positive or positive, negative, negative and positive in order from the object side, and the third lens unit of negative refracting power that consists of two lenses, positive and negative in order from the object side, with at least one aspherical surface incorporated in each of the second and third lens units. Even with the lens system of the invention which comprises fewer lenses than in the prior art, various aberrations can be well corrected. It is noted that for a four-unit arrangement, the second lens unit of positive refracting power may be divided into a negative refracting power component consisting of two object-side lenses and a positive refracting power component consisting of two image-side lenses, and this makes it possible to achieve a varifocal lens system in which each lens unit consists of two lenses.

Still other objects and advantages of the invention will in part be obvious and will in part be apparent from the specification.

The invention accordingly comprises the features of the construction, combinations of elements, and arrangement of parts which will be exemplified in the construction hereinafter set forth, and the scope of the invention will be indicated in the claims.

BRIEF DESCRIPTION OF THE DRAWINGS

The invention will now be explained, more specifically but not exclusively, with reference to the accompanying drawings, in which.

DESCRIPTION OF THE PREFERRED EMBODIMENTS

In the following description, the invention will be explained, by way of example, with reference to Examples 1 to 6, the lens data of which will be given later.

Figure 1A:
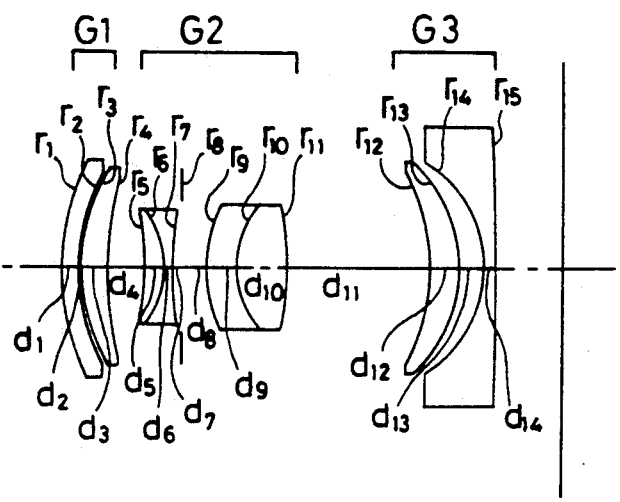
FIG. 1 represents in section the lens arrangement of Example 1 of the varifocal lens system according to the invention at the (a) wide angle end, (b) standard setting and (c) telephoto end.
Figure 1B:
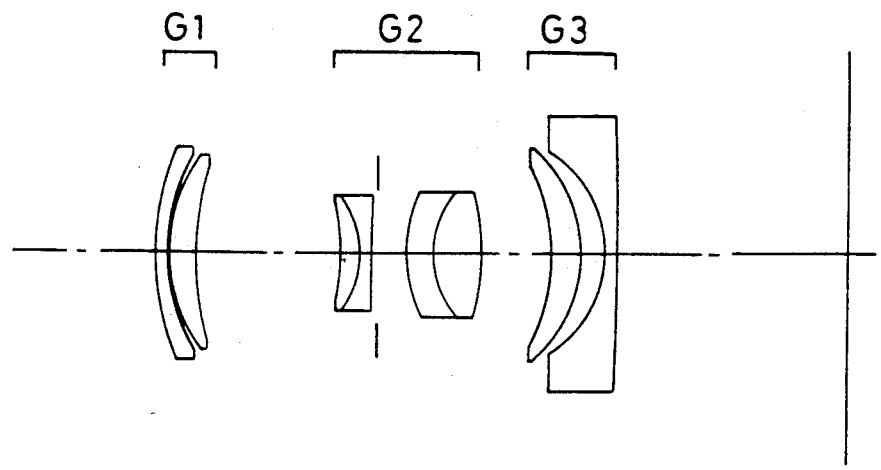
Figure 1C:
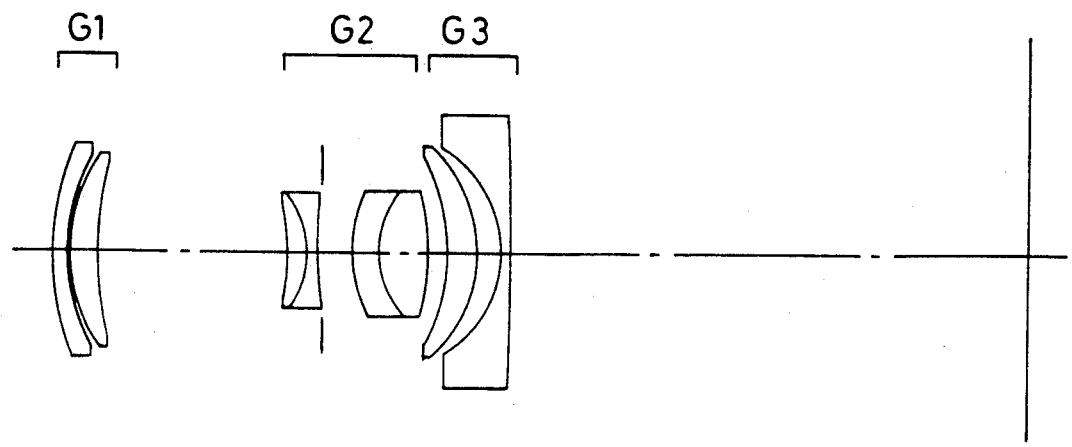

As mentioned above, FIG. 1 represents in section the lens arrangement of Example 1 at the (a) wide angle end, (b) standard setting and (c) telephoto end. As illustrated, the varifocal lens system according to Example 1 comprises a first lens unit G1 of positive refracting power, a second lens unit G2 of positive refracting power and a third lens unit G3 of negative refracting power in order from the object side. Varifocal motion is achieved by moving at least one lens unit from the wide angle to telephoto ends with the air space between the first and second lens units G1 and G2 increasing while the air space between the second and third lens units G2 and G3 decreasing.

Referring now to the lens arrangement of each unit, the first unit G1 consists of two lenses, i.e., a negative meniscus lens convex on the object side and a positive meniscus lens convex on the object side, the second unit G2 consists of a cemented lens made up of a positive meniscus lens convex on the image side and a double-concave lens, an aperture stop and a cemented lens made up of a negative meniscus lens convex on the object side and a double-convex lens (the number of the lenses used being four in all), and the third unit G3 consists of two lenses, i.e., a positive meniscus lens convex on the image side and a negative meniscus lens convex on the image side.

In Example 1, aspherical surfaces are applied to the surfaces of the second unit G2 that are proximate to the object and image sides and an aspherical surface to the surface of the third unit G3 that is proximate to the object side, three in all. To be more specific, the two surfaces of the second unit G2 are each in an aspherical form that is designed to decrease in terms of positive refracting power as it is spaced away from the optical axis, and this design is chiefly to correct spherical aberration. The aspherical surface incorporated in the third unit G3, on the other hand, is designed to decrease in terms of negative refracting power as it is spaced away from the optical axis, and this design is particularly to correct positive distortion at the wide angle end. The instant example provides a varifocal lens system that uses such aspherical surfaces, conforms to the conditional formulae mentioned above and achieves a varifocal ratio of about 3 with eight lenses in all.

Figure 2:
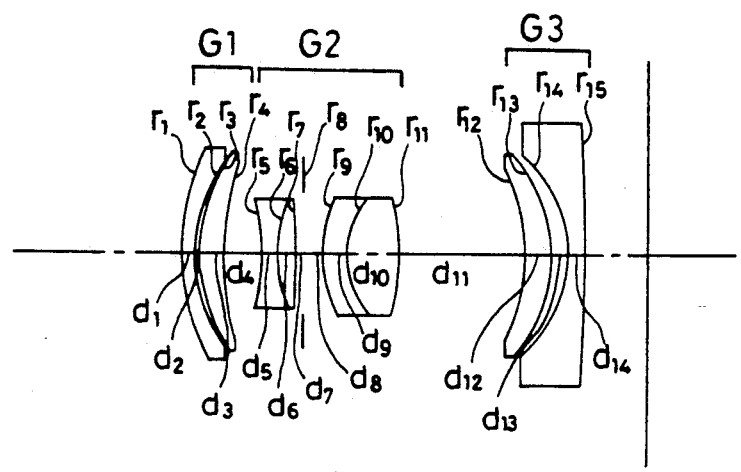
FIG. 2 represents in section the lens arrangement of Example 2 at the wide angle end.

Shown in FIG. 2 is the section of the lens arrangement of Example 2 at the wide angle end. The lens arrangement of Ex. 2 is similar in construction to that of Ex. 1 with the exception that the cemented surface of the cemented lens of the second unit G2 that is located o the object side is made convex on the object side, so that it can be concentric with respect to the stop. This arrangement relieves some considerable load on aberration correction, and makes it possible to achieve good performance, even when two aspherical surfaces in all are applied to the surface of the second unit G2 that is proximate to the image side and the surface of the third unit G3 that is proximate to the object side. This is in contrast to Example 1 for which three aspherical surfaces are needed. The aspherical surface of the second unit G2 is designed to decrease in terms of positive refracting power as it is spaced away form the optical axis, and this design is chiefly to correct spherical surface, while the aspherical surface of the third unit G3 is designed to decrease in terms of negative refracting power as it is spaced away from the optical axis, and this design is particularly to correct positive distortion at the wide angle end.

The lens arrangement of Example 3 is similar in construction and the location of aspherical surfaces to that of Example 2, and so is not illustrated. However, the gap between the principal points of the second unit G2 is so narrowed that the total length at the wide angle end can be reduced by about 3 mm when compared with Example 2, and a telephoto ratio of about 1.34 can be obtained. The configuration and effect of aspherical surfaces are similar to those of Example 2.

Figure 3:
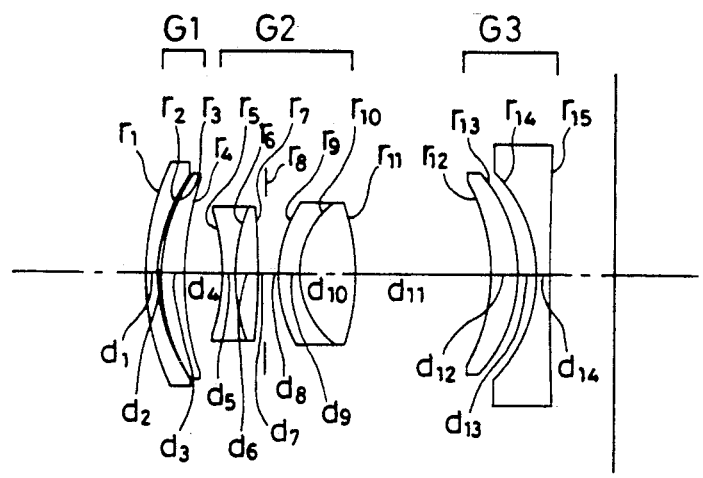
FIG. 3 represents in section the lens arrangement of Example 4 at the wide angle end.

Shown in FIG. 3 is the section of the lens arrangement of Example 4 at the wide angle end. The lens arrangement of Example 4 is similar in construction and the number of aspherical surfaces to those of Examples 2 and 3. However, the negative lens of the third unit G3 is constructed from a double-concave lens and aspherical surfaces are applied to the surface of the second unit G2 that is proximate to the image side and the surface of the third unit G3 that is proximate to the image side, whereby the lens system is made bright, as expressed in terms of F-numbers that are 3.5 and 5.5 at the wide angle and telephoto ends, respectively.

Figure 4:
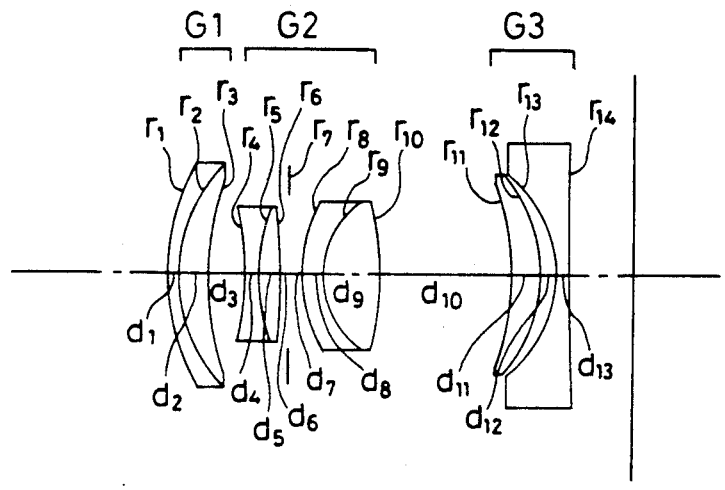
FIG. 4 represents in section the lens arrangement of Example 5 at the wide angle end.

Shown in FIG. 4 is the section of the lens arrangement of Example 5 at the wide angle end. This arrangement is similar in F-numbers and the number of aspherical surfaces to that of Example 4. However, the first unit G1 is constructed from a cemented lens, whereby the lens frame can be simplified in structure. In addition, the application of an aspherical surface to the surface of the third unit G3 that is proximate to the object side enables the maximum aspherical quantity to be reduced to about 70% and, hence, some cost reduction to be achieved, while the performance of the lens system is kept on the same level as in Example 4.

Figure 5A:
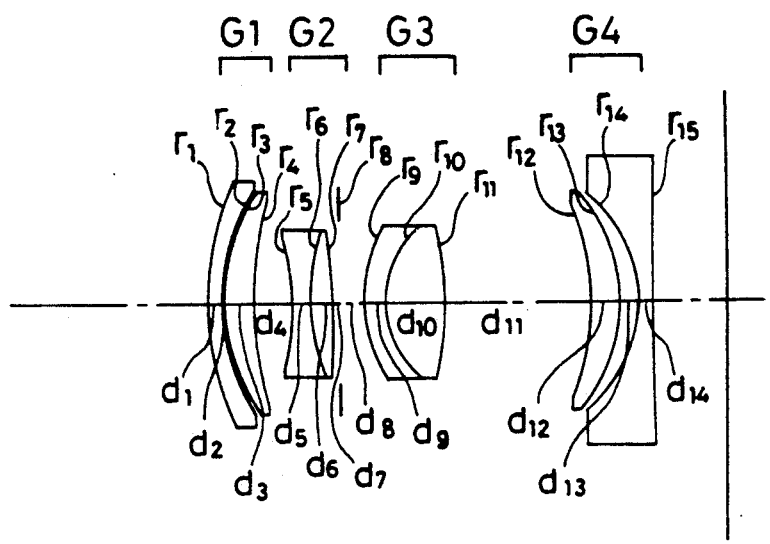
FIG. 5 represents in section the lens arrangement of Example 6 at the (a) wide angle end, (b) standard setting and (c) telephoto end, FIG. 6 provides aberration diagrams of Example 1 showing spherical aberration, astigmatism, distortion and chromatic aberration of magnification at the (a) wide angle end, (b) standard setting and (c) telephoto end, when the object point at the infinite point is focused, FIG. 7 provides aberration diagrams of Example 2 similar to FIG. 6, FIG. 8 provides aberration diagrams of Example 3 similar to FIG. 6, FIG. 9 provides aberration diagrams of Example 4 similar to FIG. 6, FIG. 10 provides aberration diagrams of Example 5 similar to FIG. 6, and FIG. 11 provides aberration diagrams of Example 6 similar to FIG. 6.
Figure 5B:
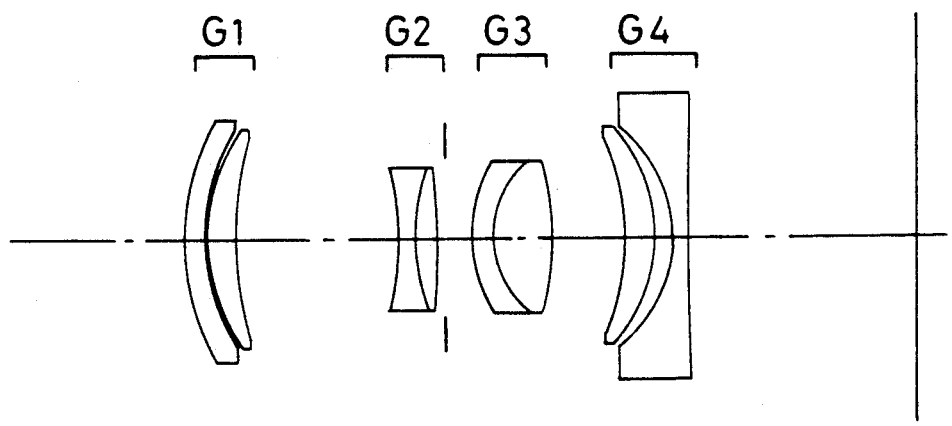
Figure 5C:
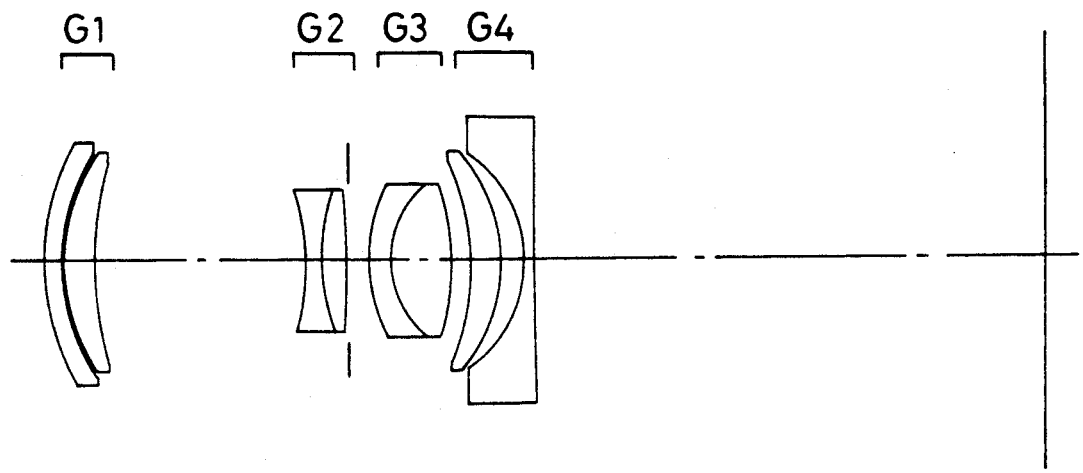

Shown in FIG. 5 are the sections of the lens arrangements of Example 6 at the (a) wide angle end, (b) standard setting and (c) telephoto end. This lens system is similar in construction to those of Examples 2 and 3 with the exception that the second unit G2 of positive refracting power is divided into a component of negative refracting power and a component of positive refracting power, as viewed in order from the object side. To be more specific, the lens system of Example 6 is of a four-unit type; it comprises, in order from the object side, a first lens unit G1 of positive refracting power, a second lens unit G2 of negative refracting power, a third lens unit G3 of positive refracting power and a fourth lens unit G4 of negative refracting power, so that it can be made brighter than those of Examples 4 and 5, as expressed in terms of an F-number that is reduced to 2.8 at the wide angle end. It is noted that the stop is movable together with the second unit G2.

Enumerated below are the lens data of Examples 1–6. It is noted, however, that symbols used hereinafter but not hereinbefore have the following means:

f is the focal length of the total system;
$F_{NO}$ is the F-number;
$\omega$ is the half field angle;
$f_B$ is the back focus;
$r_1, r_2 \ldots$ are the radii of curvature of the lens surfaces;

$d_1, d_2 \ldots$ are the space between the adjacent lens surfaces;

$n_{d1}, n_{d2} \ldots$ are the d-line refractive indices of the lens surfaces; and $\nu_{d1}, \sigma_{d2} \ldots$ are the Abbe's numbers of the lenses.

EXAMPLE 1

$f = 36.20 \sim 60.50 \sim 101.15$
$F_{NO} = 4.65 \sim 5.59 \sim 6.73$
$\omega = 30.06° \sim 19.32° \sim 11.95°$
$f_B = 6.999 \sim 24.102 \sim 54.471$

| | | |
|---|---|---|
| $r_1 = 25.2651$ | $d_1 = 1.5000$ | $n_{d1} = 1.80518 \quad \nu_{d1} = 25.43$ |
| $r_2 = 18.6495$ | $d_2 = 0.1500$ | |
| $r_3 = 17.4530$ | $d_3 = 3.0000$ | $n_{d2} = 1.69680 \quad \nu_{d2} = 56.49$ |
| $r_4 = 35.7961$ | $d_4 = $ (Variable) | |
| $r_5 = -23.3137$ (Aspheric) | $d_5 = 2.0000$ | $n_{d3} = 1.84666 \quad \nu_{d3} = 23.78$ |
| $r_6 = -9.8545$ | $d_6 = 1.2058$ | $n_{d4} = 2.80440 \quad \nu_{d4} = 39.58$ |
| $r_7 = 249.8531$ | $d_7 = 0.8000$ | |
| $r_8 = \infty$ (Stop) | $d_8 = 2.4740$ | |
| $r_9 = 15.0672$ | $d_9 = 3.0499$ | $n_{d5} = 2.80518 \quad \nu_{d5} = 25.43$ |
| $r_{10} = 8.4640$ | $d_{10} = 5.5000$ | $n_{d6} = 1.61700 \quad \nu_{d6} = 62.79$ |
| $r_{11} = -21.5967$ (Aspheric) | $d_{11} = $ (Variable) | |
| $r_{12} = -18.5056$ (Aspheric) | $d_{12} = 3.0040$ | $n_{d7} = 1.84666 \quad \nu_{d7} = 23.78$ |
| $r_{13} = -14.5515$ | $d_{13} = 2.2000$ | |
| $r_{14} = -12.6494$ | $d_{14} = 1.4000$ | $n_{d8} = 1.69680 \quad \nu_{d8} = 56.49$ |
| $r_{15} = -307.3199$ | | |

Zooming Spaces

| f | 36.20 | 60.50 | 101.15 |
|---|---|---|---|
| $d_4$ | 4.058 | 15.078 | 19.899 |
| $d_{11}$ | 14.921 | 7.422 | 2.000 |

Aspherical Coefficients
5th surface
$P = 1$
$A_4 = -0.13920 \times 10^{-4}$
$A_6 = -0.15252 \times 10^{-6}$
$A_8 = 0.60912 \times 10^{-8}$
$A_{10} = -0.13008 \times 10^{-9}$ 11th surface
$P = 1$
$A_4 = 0.49210 \times 10^{-4}$
$A_6 = 0.35432 \times 10^{-6}$
$A_8 = -0.12220 \times 10^{-7}$
$A_{10} = 0.14380 \times 10^{-9}$ 12th surface
$P = 1$
$A_4 = 0.18776 \times 10^{-4}$
$A_6 = 0.89474 \times 10^{-7}$
$A_8 = -0.38737 \times 10^{-9}$
$A_{10} = 0.40684 \times 10^{-11}$

EXAMPLE 2

$f = 36.20 \sim 60.50 \sim 101.15$
$f_{NO} = 4.65 \sim 5.59 \sim 6.73$
$\omega = 30.07° \sim 19.32° \sim 11.95°$
$f_B = 7.000 \sim 23.333 \sim 51.732$

| | | |
|---|---|---|
| $r_1 = 23.2975$ | $d_1 = 1.5000$ | $n_{d1} = 1.80518 \quad \nu_{d1} = 25.43$ |
| $r_2 = 17.2668$ | $d_2 = 0.1500$ | |
| $r_3 = 16.7868$ | $d_3 = 3.2000$ | $n_{d2} = 1.69680 \quad \nu_{d2} = 56.49$ |
| $r_4 = 33.9222$ | $d_4 = $ (Variable) | |
| $r_5 = -22.8567$ | $d_5 = 1.5503$ | $n_{d3} = 1.80440 \quad \nu_{d3} = 39.58$ |
| $r_6 = 18.1948$ | $d_6 = 2.0135$ | $n_{d4} = 1.84666 \quad \nu_{d4} = 23.78$ |
| $r_7 = -1742.5579$ | $d_7 = 1.0116$ | |
| $r_8 = \infty$ (Stop) | $d_8 = 2.0791$ | |
| $r_9 = 15.0662$ | $d_9 = 2.6965$ | $n_{d5} = 1.80518 \quad \nu_{d5} = 25.43$ |
| $r_{10} = 8.8128$ | $d_{10} = 6.000$ | $n_{d6} = 1.61700 \quad \nu_{d6} = 62.79$ |
| $r_{11} = -23.0510$ (Aspheric) | $d_{11} = $ (Variable) | |
| $r_{12} = -18.2110$ (Aspheric) | $d_{12} = 3.000$ | $n_{d7} = 1.84666 \quad \nu_{d7} = 23.78$ |
| $r_{13} = -14.4999$ | $d_{13} = 2.0442$ | |
| $r_{14} = -12.3395$ | $d_{14} = 1.4000$ | $n_{d8} = 1.69680 \quad \nu_{d8} = 56.49$ |
| $r_{15} = -355.1925$ | | |

Zooming Spaces

| f | 36.20 | 60.50 | 101.15 |
|---|---|---|---|
| $d_4$ | 4.058 | 14.945 | 20.342 |
| $d_{11}$ | 13.996 | 7.039 | 2.000 |

Aspherical Coefficients
11th surface
$P = 1$
$A_4 = 0.65747 \times 10^{-4}$
$A_6 = 0.39772 \times 10^{-6}$
$A_8 = -0.12752 \times 10^{-7}$
$A_{10} = 0.19109 \times 10^{-9}$ 12th surface
$P = 1$
$A_4 = 0.27890 \times 10^{-4}$
$A_6 = 0.11959 \times 10^{-6}$
$A_8 = -0.66367 \times 10^{-9}$
$A_{10} = 0.70060 \times 10^{-11}$

EXAMPLE 3

$f = 36.20 \sim 60.50 \sim 101.15$
$f_{NO} = 4.65 \sim 5.59 \sim 6.73$
$\omega = 29.99° \sim 19.29° \sim 11.93°$
$f_B = 7.000 \sim 23.240 \sim 52.082$

| | | |
|---|---|---|
| $r_1 = 21.0811$ | $d_1 = 1.5000$ | $n_{d1} = 1.80518 \quad \nu_{d1} = 25.43$ |
| $r_2 = 15.8869$ | $d_2 = 0.1500$ | |
| $r_3 = 15.5303$ | $d_3 = 3.2000$ | $n_{d2} = 1.69680 \quad \nu_{d2} = 56.49$ |
| $r_4 = 30.7637$ | $d_4 = $ (Variable) | |
| $r_5 = -18.6054$ | $d_5 = 1.2104$ | $n_{d3} = 1.80440 \quad \nu_{d3} = 39.58$ |
| $r_6 = 16.4328$ | $d_6 = 2.0135$ | $n_{d4} = 1.84666 \quad \nu_{d4} = 23.78$ |
| $r_7 = -196.3181$ | $d_7 = 0.9014$ | |
| $r_8 = \infty$ (Stop) | $d_8 = 0.7425$ | |
| $r_9 = 15.7061$ | $d_9 = 2.2172$ | $n_{d5} = 1.80518 \quad \nu_{d5} = 25.43$ |
| $r_{10} = 8.6316$ | $d_{10} = 5.0063$ | $n_{d6} = 1.61700 \quad \nu_{d6} = 62.79$ |
| $r_{11} = -19.0116$ (Aspheric) | $d_{11} = $ (Variable) | |
| $r_{12} = -16.5246$ (Aspheric) | $d_{12} = 3.0842$ | $n_{d7} = 1.84666 \quad \nu_{d7} = 23.78$ |
| $r_{13} = -13.5123$ | $d_{13} = 1.9000$ | |
| $r_{14} = -11.9951$ | $d_{14} = 1.4000$ | $n_{d8} = 1.69680 \quad \nu_{d8} = 56.49$ |
| $r_{15} = -144.1865$ | | |

Zooming Spaces

| f | 36.20 | 60.50 | 101.15 |
|---|---|---|---|
| $d_4$ | 3.500 | 14.761 | 19.926 |
| $d_{11}$ | 14.607 | 7.342 | 2.000 |

Aspherical Coefficients
11th surface
$P = 1$
$A_4 = 0.58707 \times 10^{-4}$
$A_6 = 0.92100 \times 10^{-6}$
$A_8 = -0.33567 \times 10^{-7}$
$A_{10} = 0.54129 \times 10^{-9}$ 12th surface
$P = 1$
$A_4 = 0.21851 \times 10^{-4}$
$A_6 = 0.39988 \times 10^{-6}$
$A_8 = -0.44141 \times 10^{-8}$
$A_{10} = 0.27098 \times 10^{-10}$

EXAMPLE 4

$f = 36.00 \sim 60.50 \sim 102.00$
$F_{NO} = 3.50 \sim 4.60 \sim 5.50$
$\omega = 30.17° \sim 19.30° \sim 11.83°$
$f_B = 7.000 \sim 23.749 \sim 52.837$

| | | |
|---|---|---|
| $r_1 = 25.5690$ | $d_1 = 1.5000$ | $n_{d1} = 1.80518 \quad \nu_{d1} = 25.43$ |
| $r_2 = 19.3512$ | $d_2 = 0.1500$ | |
| $r_3 = 18.4521$ | $d_3 = 3.2000$ | $n_{d2} = 1.69680 \quad \nu_{d2} = 56.49$ |
| $r_4 = 37.8665$ | $d_4 = $ (Variable) | |
| $r_5 = -20.8416$ | $d_5 = 1.2013$ | $n_{d3} = 1.80440 \quad \nu_{d3} = 39.58$ |
| $r_6 = 24.1083$ | $d_6 = 2.2000$ | $n_{d4} = 1.84666 \quad \nu_{d4} = 23.78$ |
| $r_7 = -168.4099$ | $d_7 = 1.000$ | |
| $r_8 = \infty$ (Stop) | $d_8 = 1.9091$ | |
| $r_9 = 17.1643$ | $d_9 = 2.1950$ | $n_{d5} = 1.80518 \quad \nu_{d5} = 25.43$ |
| $r_{10} = 10.0237$ | $d_{10} = 6.1410$ | $n_{d6} = 1.61700 \quad \nu_{d6} = 62.79$ |

-continued $r_{11} = -21.3724$ (Aspheric)
$r_{12} = -20.9178$  $d_{12} = 3.0000$  $n_{d7} = 1.84666$  $\nu_{d7} = 23.78$
$r_{13} = -15.4328$  $d_{13} = 2.0000$
$r_{14} = -14.1016$  $d_{14} = 1.4000$  $n_{d8} = 1.69680$  $\nu_{d8} = 56.49$
$r_{15} = 140.2045$ (Aspheric)

Zooming Spaces

| f | 36.00 | 60.50 | 102.00 |
|---|---|---|---|
| $d_4$ | 4.058 | 15.742 | 22.005 |
| $d_{11}$ | 15.165 | 7.573 | 2.000 |

Aspherical Coefficients
11th surface
P = 1
$A_4 = 0.56732 \times 10^{-4}$
$A_6 = -0.65198 \times 10^{-7}$
$A_8 = 0.29621 \times 10^{-8}$
$A_{10} = -0.17515 \times 10^{-10}$ 15th surface
P = 1
$A_4 = -0.18266 \times 10^{-4}$
$A_6 = 0.61242 \times 10^{-7}$
$A_8 = 0.12954 \times 10^{-9}$
$A_{10} = 0.12953 \times 10^{-12}$

EXAMPLE 5

$f = 36.00 \sim 60.50 \sim 102.00$
$F_{NO} = 3.50 \sim 4.60 \sim 5.50$
$\omega = 29.99° \sim 19.39° \sim 11.89°$
$f_B = 7.001 \sim 25.388 \sim 54.526$ $r_1 = 21.7956$  $d_1 = 1.4311$  $n_{d1} = 1.80518$  $\nu_{d1} = 25.43$
$r_2 = 17.2338$  $d_2 = 3.1045$  $n_{d2} = 1.69680$  $\nu_{d2} = 56.49$
$r_3 = 29.8125$  $d_3 = $ (Variable)
$r_4 = -22.9552$  $d_4 = 1.2738$  $n_{d3} = 1.80440$  $\nu_{d3} = 39.58$
$r_5 = 22.3854$  $d_5 = 2.2000$  $n_{d4} = 1.84666$  $\nu_{d4} = 23.78$
$r_6 = -824.5197$  $d_6 = 1.0000$
$r_7 = \infty$ (Stop)  $d_7 = 2.0575$
$r_8 = 15.6543$  $d_8 = 2.3238$  $n_{d5} = 1.80518$  $\nu_{d5} = 25.43$
$r_9 = 9.4697$  $d_9 = 6.0244$  $n_{d6} = 1.61700$  $\nu_{d6} = 62.79$
$r_{10} = -22.7508$  $d_{10} = $ (Variable)
(Aspheric)
$r_{11} = -22.5859$  $d_{11} = 3.0000$  $n_{d7} = 1.84666$  $\nu_{d7} = 23.78$
(Aspheric)
$r_{12} = -16.3702$  $d_{12} = 2.0000$
$r_{13} = -12.9069$  $d_{13} = 1.4000$  $n_{d8} = 1.69680$  $\nu_{d8} = 56.49$
$r_{14} = 6518.4039$ Zooming Spaces

| f | 36.00 | 60.50 | 102.00 |
|---|---|---|---|
| $d_3$ | 4.058 | 13.939 | 22.086 |
| $d_{10}$ | 14.870 | 7.296 | 2.000 |

Aspherical Coefficients
10th surface
P = 1
$A_4 = 0.65545 \times 10^{-4}$
$A_6 = 0.65835 \times 10^{-7}$
$A_8 = -0.21976 \times 10^{-8}$
$A_{10} = 0.29368 \times 10^{-10}$ 11th surface
P = 1
$A_4 = 0.24441 \times 10^{-4}$
$A_6 = 0.53036 \times 10^{-7}$
$A_8 = 0.38149 \times 10^{-9}$
$A_{10} = 0.47886 \times 10^{-11}$

EXAMPLE 6

$f = 36.00 \sim 60.50 \sim 102.00$
$F_{NO} = 2.80 \sim 4.00 \sim 5.50$
$\omega = 30.14° \sim 19.38° \sim 11.83°$
$f_B = 7.000 \sim 23.392 \sim 51.928$ $r_1 = 24.8425$  $d_1 = 1.5000$  $n_{d1} = 1.80518$  $\nu_{d1} = 25.43$
$r_2 = 18.5265$  $d_2 = 0.1500$
$r_3 = 17.9785$  $d_3 = 3.2000$  $n_{d2} = 1.69680$  $\nu_{d2} = 56.49$
$r_4 = 37.5190$  $d_4 = $ (Variable)
$r_5 = -22.6604$  $d_5 = 1.4709$  $n_{d3} = 1.80440$  $\nu_{d3} = 39.58$
$r_6 = 20.0538$  $d_6 = 2.2000$  $n_{d4} = 1.84666$  $\nu_{d4} = 23.78$
$r_7 = -497.4570$  $d_7 = 1.0000$
$r_8 = \infty$ (Stop)  $d_8 = $ (Variable)
$r_9 = 15.7649$  $d_9 = 2.3318$  $n_{d5} = 1.80518$  $\nu_{d5} = 25.43$
$r_{10} = 9.3315$  $d_{10} = 6.0106$  $n_{d6} = 1.61700$  $\nu_{d6} = 62.79$
$r_{11} = -23.6475$  $d_{11} = $ (Variable)
(Aspheric)
$r_{12} = -21.3076$  $d_{12} = 3.0000$  $n_{d7} = 1.84666$  $\nu_{d7} = 23.78$
(Aspheric)
$r_{13} = -15.8954$  $d_{13} = 2.0000$
$r_{14} = -12.7239$  $d_{14} = 1.4000$  $n_{d8} = 1.69680$  $\nu_{d8} = 56.49$
$r_{15} = -643.9197$ Zooming Spaces

| f | 36.00 | 60.50 | 102.00 |
|---|---|---|---|
| $d_4$ | 4.058 | 16.507 | 21.599 |
| $d_8$ | 2.403 | 2.499 | 1.577 |
| $d_{11}$ | 14.751 | 7.246 | 2.000 |

Aspherical Coefficients
11th surface
P = 1
$A_4 = 0.57418 \times 10^{-4}$
$A_6 = -0.67859 \times 10^{-7}$
$A_8 = -0.10151 \times 10^{-9}$
$A_{10} = 0.29139 \times 10^{-10}$ 12th surface
P = 1
$A_4 = 0.23518 \times 10^{-4}$
$A_6 = 0.49365 \times 10^{-7}$
$A_8 = -0.29602 \times 10^{-9}$
$A_{10} = 0.65842 \times 10^{-11}$ Shown in FIGS. 6-11 are aberration diagrams illustrating spherical aberrations, astigmatisms, distortions and chromatic aberrations of the varifocal lens systems of Examples 1-6 at the (a) wide angle ends, (b) standard settings and (c) telephoto ends, when the object points at the infinite point are focused.

Also set out in the following table are the values of the conditions (1) to (6) in Examples 1-6.

| Conditions | Ex. 1 | Ex. 2 | Ex. 3 | Ex. 4 | Ex. 5 | Ex. 6 |
|---|---|---|---|---|---|---|
| 1 | 0.390 | 0.392 | 0.437 | 0.389 | 0.341 | 0.388 |
| 2 | 0.312 | 0.305 | 0.354 | 0.315 | 0.268 | 0.310 |
| 3 | −0.728 | −0.683 | −0.705 | −0.728 | −0.729 | −0.725 |
| 4 | 0.00956 | 0.0122 | 0.0110 | 0.0161 | 0.0110 | 0.0109 |
| 5 | 0.0108 | 0.00961 | 0.00904 | 0.0163 | 0.0204 | 0.0150 |
| 6 | −0.734 | −0.630 | −0.695 | −0.609 | −0.670 | −0.600 |

In the above table, it is noted that the values of the conditions (1)-(3) in Example 6 are indeed those found by conditions (1')-(3').

According to the invention, it is possible to obtain a compact, light-weight varifocal lens system that has a varifocal ratio of about 3, comprises some 8 lenses, has a short total length and is well corrected in terms of various aberrations from the wide angle to telephoto ends, as explained at great length and as can be understood from the examples.

What we claim is:

1. A varifocal lens system comprising, in order from the object side, a first lens unit of positive refracting power, a second lens unit of positive refracting power and a third lens unit of negative refracting power, in which at least one of said first, second and third lens units is moved such that the air space between said first and second lens units widens from the wide angle to telephoto ends and the air space between said second and third lens units narrows from the wide angle to telephoto ends, thereby achieving varifocal motion, and which conforms to the following conditional formulae (1) and (6):

$$0.2 < f_w/f_l < 0.5 \tag{1, and}$$

$$-1.0 < f_w/f_s < -0.5 \tag{6}$$

where $f_w$ is the composite focal length of the total system at the wide angle end, $f_l$ is the composite focal length of the first lens unit and $f_s$ is the composite focal length at the wide angle end of the lenses located on the object side in front of an aperture stop.

2. A varifocal lens system comprising, in order from the object side, a first lens unit of positive refracting power, a second lens unit of negative refracting power, a third lens unit of positive refracting power and a fourth lens unit of negative refracting power, in which at least two of said first, second, third and fourth lens units are moved such that the air space between said first and second lens units widens from the wide angle to telephoto ends, the air space between said second and third lens units varies from the wide angle to telephoto ends, and the air space between said third and fourth lens units narrows from the wide angle to telephoto ends, thereby achieving varifocal motion, and which conforms to the following conditional formulae (1) and (6):

$$0.2 < f_w/f_l < 0.5 \tag{1, and}$$

$$-1.0 < f_w/f_s - 0.5 \tag{6}$$

where $f_w$ is the composite focal length of the total system at the wide angle end, $f_l$ is the composite focal length of the first lens unit and $f_s$ is the composite focal length at the wide angle end of the lenses located on the object side in front of an aperture stop.

3. A varifocal lens system as claimed in claim 1, wherein at least one aspherical surface is incorporated in said third lens unit.

4. A varifocal lens system as claimed in claim 2, wherein at least one aspherical surface is incorporated in said fourth lens unit.

5. A varifocal lens system as claimed in claim 1 or 3, which conforms to the following condition (2):

$$0.15 < f_2/f_1 < 0.45 \tag{2}$$

where $f_2$ is the composite focal length of the second lens unit.

6. A varifocal lens system as claimed in claim 2 or 4, which conforms to the following condition (2'):

$$0.15 < f_{23}/f_1 < 0.45 \tag{2'}$$

where $f_{23}$ is the composite focal length of the second and third lens units at the wide angle end.

7. A varifocal lens system as claimed in claim 1 or 3, which conforms to the following condition (3):

$$-0.9 < f_3/f_w < -0.6 \tag{3}$$

where $f_3$ is the composite focal length of the third lens unit.

8. A varifocal lens system as claimed in claim 2 or 4, which conforms to the following condition (3'):

$$-0.9 < f_4/f_w < -0.6 \tag{3'}$$

where $f_4$ is the composite focal length of the fourth lens unit.

9. A varifocal lens system as claimed in claim 1, wherein at least one aspherical surface is incorporated in said second lens unit.

10. A varifocal lens system as claimed in claim 2, wherein at least one aspherical surface is incorporated in said third lens unit.

11. A varifocal lens system as claimed in claim 9, which conforms to the following condition (2):

$$0.15 < f_2/f_1 < 0.45 \tag{2}$$

where $f_2$ is the composite focal length of the second lens unit.

12. A varifocal lens system as claimed in claim 10, which conforms to the following condition (2'):

$$0.15 < f_{23}/f_1 < 0.45 \tag{2'}$$

where $f_{23}$ is the composite focal length of the second and third lens units at the wide angle end.

13. A varifocal lens system as claimed in claim 9, which conforms to the following condition (3):

$$-0.9 < f_3/f_w < -0.6 \tag{3}$$

where $f_3$ is the composite focal length of the third lens unit.

14. A varifocal lens system as claimed in claim 10, which conforms to the following condition (3'):

$$-0.9 < f_4/f_w < -0.6 \tag{3'}$$

where $f_4$ is the composite focal length of the fourth lens unit.

15. A varifocal lens system as claimed in claim 1, wherein said second and third lens units each include an aspherical surface.

16. A varifocal lens system as claimed in claim 2, wherein said third and fourth lens units each include an aspherical surface.

17. A varifocal lens system as claimed in claim 3 or 4, which conforms to the following condition (4):

$$0.1 \times 10^{-2} < \Sigma |\Delta_x|/h < 0.3 \times 10^{-1} \tag{4}$$

where $\Delta_x$ denotes the aspherical quantity at the ray height at which the principal ray reaching the maximum image height at the wide angle end passes through the aspherical surface, h stands for the maximum image height and $\Sigma$ represents the sum of a plurality of aspherical surfaces, when they are used.

18. A varifocal lens system as claimed in claim 9 or 10, which conforms to the following condition (5):

$$0.1 \times 10^{-2} < \Sigma(|\Delta_{xm}|/h_m) < 0.3 \times 10^{-1} \tag{5}$$

where $h_m$ represents the height of a marginal ray when the marginal ray with the object point at the infinite point passes through the aspherical surface, $\Delta_{xm}$ stands for the aspherical quantity at that ray height and $\Sigma$ denotes the sum of a plurality of aspherical surfaces, when they are used.

19. A varifocal lens system as claimed in claim 1, which conforms to the following conditions (2) and (3):

$$0.15 < f_2/f_1 < 0.45 \quad (2), \text{ and}$$

$$-0.9 < f_3/f_w < -0.6 \quad (3)$$

where $f_2$ is the composite focal length of the second lens unit and $f_3$ is the composite focal length of the third lens unit.

20. A varifocal lens system as claimed in claim 1, which conforms to the following conditions (2') and (3'):

$$0.15 < f_{23}/f_1 < 0.45 \quad (2'), \text{ and}$$

$$-0.9 < f_4/f_w < -0.6 \quad (3')$$

where $f_{23}$ is the composite focal length of the second and third lens units at the wide angle end and $F_4$ is the composite focal length of the fourth lens unit.

21. A varifocal lens system comprising, in order from the object side, a first lens unit consisting of a first negative lens and a second positive lens and having a positive refracting power as a whole, a second lens unit consisting of a first positive lens, a second negative lens, a third negative lens and a fourth positive lens and having a positive refracting power as a whole, and a third lens unit consisting of a first positive lens and a second negative lens and having a negative refracting power as a whole, wherein the air space between said first and second lens units is increased from the wide angle to telephoto ends and the air space between said second and third lens units is decreased from the wide angle to telephoto ends, thereby achieving varifocal motion.

22. A varifocal lens system as claimed in claim 21, wherein an aperture stop is located between the second and third lenses of said second lens unit.

23. A varifocal lens system comprising, in order from the object side, a first lens unit consisting of a first negative lens and a second positive lens and having a positive refracting power as a whole, a second lens unit consisting of a first positive lens, a second negative lens, a third negative lens and a fourth positive lens and having a positive refracting power as a whole, and a third lens unit consisting of a first positive lens and a second negative lens and having a negative refracting power as a whole, in which the air space between said first and second lens units in increased from the wide angle to telephoto ends and the air space between said second and third lens units is decreased from the wide angle to telephoto ends, thereby achieving varifocal motion and which conforms to the following condition (6):

$$-1.0 < f_w/f_s < -0.5 \quad (6)$$

where $f_w$ is the composite focal length of the total system at the wide angle end, and $f_s$ is the composite focal length at the wide angle end of the lenses located on the object side in front of an aperture stop.

24. A varifocal lens system as claimed in claim 23, wherein an aperture stop is located between the second and third lenses of said second lens unit.

25. A varifocal lens system comprising, in order from the object side, a first lens unit consisting of a negative lens and a positive lens and having a positive refracting power as a whole, a second lens unit consisting of a negative lens and a positive lens and having a negative refracting power as a whole, a third lens unit consisting of a negative lens and a positive lens and having a positive refracting power as a whole and a fourth lens unit consisting of a positive lens and a negative lens and having a negative refracting power as a whole, wherein, from the wide angle to telephoto ends, the air space between said first and second lens units increases, the air space between said second and third lens units varies and the air space between said third and fourth lens units decreases, thereby achieving varifocal motion.

26. A varifocal lens system as claimed in claim 25, wherein an aperture stop is located between the second and third lens units.

27. A varifocal lens system as claimed in claim 25 or 26, wherein, in effecting varifocal motion, the air space between said second and third lens units varies in such a way that it increases initially to a given point, whence it decreases.

* * * * *